March 20, 1956   J. H. CHILES, JR   2,739,001
GASKETS WITH STOPS THEREIN
Filed Sept. 13, 1952
Fig. 1.
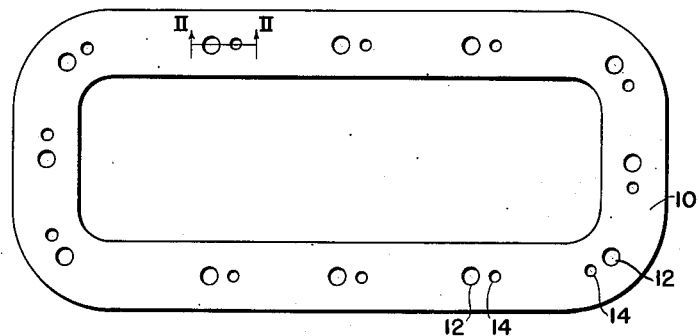
Fig. 2.
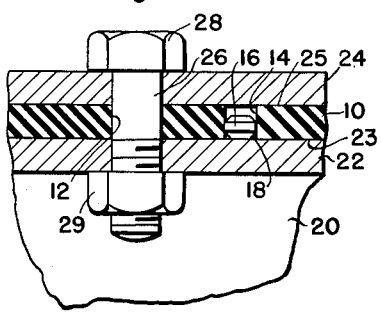
Fig. 3.
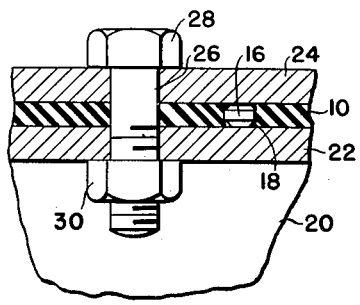
Fig. 4.
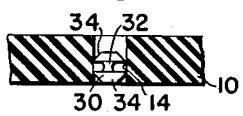
Fig. 5.
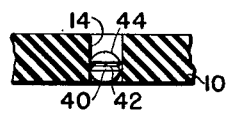
Fig. 6.
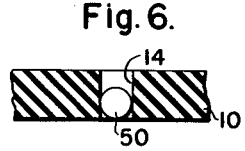
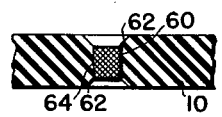
Fig. 7.
WITNESSES:
John E. Heasley
Leon J. Faja
INVENTOR
John H. Chiles, Jr.
BY
Frederick Shapoe
ATTORNEY

UNITED STATES PATENT OFFICE 2,739,001
Patented Mar. 20, 1956

2,739,001

GASKETS WITH STOPS THEREIN

John H. Chiles, Jr., Sharon, Pa., assignor to Westinghouse Electric Corporation, East Pittsburgh, Pa., a corporation of Pennsylvania Application September 13, 1952, Serial No. 309,496

4 Claims. (Cl. 288—20)

This invention relates to gaskets comprising a compressible material provided with stops therein.

Gaskets of compressible materials, such as cork, rubber and the like, are widely employed for the purpose of sealing joints between members joined to one another. Since it is impractical to provide members with absolutely true meeting surfaces, the compressible gasket interposed between the members at the joint is compressed, and the resilient gasket accommodates itself to the meeting surfaces and fits tightly against the surfaces of the members being joined to provide a fluid-tight joint.

It is well known that if the members being joined are drawn together in an excessive amount that the interposed gasket member will be compressed beyond the elastic limit of the compressible materials of which it is composed, and consequently either a faulty joint is obtained at once or else the gasket is rendered useless if the joint is loosened or opened thereafter. Furthermore, the normal expansion and contraction of members with changes of temperature requires that a gasket have a substantial amount of resiliency after it has been applied and the joint drawn together. Overcompression of the gasket will result in the gasket failing to accommodate such expansion and contraction and maintaining a leak-proof joint.

Numerous complex schemes have been proposed heretofore for limiting the amount of compression to which a gasket may be subjected so that the gasket will retain its resiliency. However, such proposals have involved extremely expensive and complicated structures. In some instances, the gaskets have been so changed to accommodate stop means that they are less satisfactory for sealing joints. As a practical matter, gaskets with such previously proposed stop means have not been widely used.

The object of this invention is to provide a simple unitary gasket of compressible material containing a stop member tightly disposed in an aperture therein.

A further object of the invention is to provide a gasket of relatively compressible material having snugly disposed therein a relatively incompressible stop member of a length corresponding to the maximum allowable compression of the gasket.

Other objects of the invention will, in part, be obvious and will, in part, appear hereinafter.

For a better understanding of the nature and objects of the invention, reference should be had to the following description and drawing, in which:

Figure 1 is a plan view of a gasket constructed in accordance with the invention;

Fig. 2 is a fragmentary cross section of a joint embodying the gasket of the present invention before the gasket has been compressed;

Fig. 3 is a fragmentary view in cross section of the gasket member of Fig. 2 compressed to the maximum allowable extent;

Fig. 4 is a cross section of a modified form of the gasket of this invention;

Fig. 5 is a cross section through another modification of a gasket member;

Fig. 6 is a cross section through a still further modification of the gasket member of this invention; and Fig. 7 is a cross section through another modification.

In accordance with this invention, gasket members formed of a single sheet of a compressible composition are provided with one or more perforations in which there are disposed relatively incompressible stop members having central portions of a cross section fitting snugly and tightly within the perforations. The ends of the stop members are relieved by suitable tapering, beveling or chamfering to accommodate lateral flow of the gasket material into the aperture as the gasket is compressed in use. This relief enables the gasket to function properly without interference with the stop by material flowing laterally into the aperture.

In order to enable the most satisfactory results with gaskets embodying openings to accommodate bolts or other fastening means, the apertures with the stops therein are ordinarily disposed within a distance of not over five times the diameter of the bolt opening. Usually, the apertures with the stops therein are disposed within one to two bolt diameters from the opening accommodating the bolt.

It will be understood that in some instances bolts are not necessary and therefore the gasket will embody only the apertures with stops therein.

Referring to Fig. 1 of the drawing, there is illustrated a gasket 10 of generally rectangular shape suitable, for instance, for application to a rectangular cross-section casing having a flange shaped as is the gasket 10, over which a cover is to be applied. The gasket 10 will be disposed between the flange and the cover of the casing. The gasket 10 is provided with a plurality of openings or apertures 12 to accommodate bolts or other suitable fastening means for fastening the cover to the flange of said casing. Closely adjacent to each of the apertures 12 is another aperture 14 of smaller cross section than the apertures 12. It will be appreciated that there may be two or more apertures 14 associated with each of the bolt apertures 12. In some instances, there need not be an aperture 14 provided for each of the bolt apertures 12. However, for most purposes, each bolt aperture 12 will have a closely adjacent associated aperture 14.

The gasket 10 may be prepared from any of the compositions employed for gasket purposes. It may be prepared from comminuted cork or asbestos combined with a flexible resin composition such, for example, as polychlorobutadiene, or polyvinyl alcohol, or a rubber, either synthetic or natural. Numerous gasket compositions are known in the trade, and they may be used in accordance with the requirements of the particular sealing operation to which the gasket is to be applied.

In each of the apertures 14 of the gasket 10, there is disposed a relatively incompressible stop member having a central portion of a cross section, such that the stop member fits snugly within the aperture and will resist accidental dislodgement. The stop members can be forced into the apertures and when placed therein will stay in position indefinitely. Ordinarily, the apertures 14 will be of circular cross section and will extend in a direction substantially perpendicular to the upper and lower sealing surfaces of the gasket 10. Therefore, the stop member will have a maximum circular cross section slightly larger than the normal diameter of the aperture 14 so that when the stop member is forced into the aperture 14 it will stay in place. Inasmuch as most gaskets cannot be compressed more than 50%, and ordinarily not over 30% to 40% without resulting in permanent damage to the gasket, the stop members placed in apertures 14 have a total length of not less than 50% of the thickness of the gasket member from upper to lower sealing surface thereof. The stop members may comprise a relatively incompressible material, such as metal or hard fibrous or resinous compositions. Thus, the stops may be formed of brass, aluminum, steel, nickel, hard fiber, phenolic resins with or without fibrous fillers, hard wood, such as maple, and the like.

Referring to Fig. 2 of the drawing, there is illustrated a portion of a casing to which the gasket 10 of Fig. 1 has been applied. A casing 20, having a flange 22 with a surface 23 to be sealed, is to be joined with a cover 24 having a sealing surface 25. The gasket 10 is interposed between the flange 22 and the cover 24, and in contact with the sealing surfaces 23 and 25. As shown in Fig. 2, the gasket is in an uncompressed state. A bolt 26 passes through the aperture 12 in the gasket with its head 28 disposed above the cover 24 and a nut 29 below the flange 22. Within the aperture 14 is disposed a stop 16 having a central portion of a diameter slightly greater than that of the aperture 14 so that the stop 16 is held snugly therein against accidental dislodgement. The stop 16 is shorter than the perpendicular length of the aperture between the upper and lower sealing surfaces of the gasket 10. The length of the stop 16 is approximately 30% shorter than the length of the aperture 14. The upper and lower ends of the stop 16 are beveled or chamfered at 18 in order to relieve the ends.

When the nut 29 is turned on the bolt 26 to draw the cover 24 toward the flange 22, the gasket 10 will be compressed. As shown in Fig. 3 of the drawing, the nut 29 has been drawn up until the cover 24 and flange 22 seat against the ends of stop 16, and further tightening of the bolt and nut 26—29 is rendered difficult. The workman tightening the nut and bolt can tell immediately when the gasket is compressed to the extent that the stop 16 is taking the compression forces and he will then cease further tightening of the bolt and nut. The gasket 10 in the fully drawn up state has been compressed to about the maximum amount ordinarily desirable without doing damage to the gasket itself.

During the operation of drawing the cover 24 toward the flange, there is a slight lateral flow of the gasket composition into the aperture 14. However, the relief provided by beveling 18 accommodates the flow of the composition without permitting it to lap over the ends of the stop member 16. In this way, the amount of compression of the gasket can be maintained at a set value.

It will be appreciated that the aperture 14 may be of any suitable cross section, that is, square, rectangular or the like, though ordinarily a circular cross section will be found to be most convenient. The apertures 12 and 14 may be produced in the gasket by punching, drilling or other operations. Ordinarily, the stop 16 will have a cross section at its central portion corresponding to the cross section of the aperture 14. However, this is not absolutely necessary. Thus, a stop 16 with a round cross section may be introduced into a square or hexagonal aperture 14 providing, of course, that the diameter of the stop at its largest cross section is such that the stop will fit tightly against the walls of the aperture to ensure tight lodgement therein.

Referring to Fig. 4 of the drawing, there is illustrated a stop member 30 having a slightly modified shape over that of the stop 16. The stop 30 comprises a body having a central peripheral channel with a reduced diametrical portion 32. Upper and lower bevel caps 34 are affixed to the portion 32. It will be noted that the outer ends of the bevel caps 34 are of a considerably smaller diameter than the aperture 14 but that the caps 34 have a maximum diameter slightly greater than that of the aperture 14 so that the stop 30 engages tightly and snugly against the walls of the aperture 14 and is thus held in place against accidental dislodgement. The channeled central portion of the stop 30 will accommodate lateral flow in case an extremely elastic and flowable gasket composition is used for the gasket 10.

A modified stop 40 is illustrated in Fig. 5 of the drawing. The stop 40 comprises rounded or spherical ends 44 with a peripheral groove 42 across the diameter thereof. The diameter of the stop 40 is such as to engage tightly against the walls of the aperture 14 while the rounded ends provide the relief necessary to accommodate for lateral flow of the gasket material when it is being compressed.

In the stops 30 and 40 of Figures 4 and 5, the portion of the caps 34 and end 44 near the peripheral channel and peripheral grooves, respectively, constitute edges that cut into the walls of the gasket aperture and thereby are held in position better than a smooth-walled stop would be held.

In some cases, the stop members may simply comprise a spherical ball as shown in Fig. 6 of the drawing. This spherical ball 50 may comprise stainless steel or other suitable metal or a non-metal and is of a diameter slightly larger than the diameter of the aperture 14 so that the ball is held firmly within the aperture.

In Fig. 7 is illustrated another modification wherein the gasket 10 has been provided with a perforation 60 of circular cross-section terminating in flared entrances 62. The perforation 60 may be produced by punching and the ends reamed to provide the flared entrances 62. A cylindrical stop 64 of suitable length is fitted snugly into the perforation 60. The stop 64 may have knurled walls so that it will be less liable to fall out by accident. In use the flared entrances provide for lateral flow of the gasket composition thus to prevent interference with the stop 64.

While the invention has been illustrated with respect to a substantially flat gasket having substantially parallel upper and lower sealing surfaces, it will be understood that the invention may be applied to gaskets having non-parallel surfaces or of variable cross section from point to point. Also, the invention may be applied to a gasket having no openings or apertures to accommodate bolts or other fastening means. Thus, washers for use with pipes or the like may be produced with one or more stops therein as disclosed herein.

Gaskets constructed in accordance with the present invention have been found to be simple and easy to prepare. They may be fabricated from flat sheets of gasket material in a single punching operation which produces all of the apertures as well as shaping the gasket to desired configuration. The stops have been introduced into the proper apertures readily. Such gaskets have been applied to apparatus such as transformer casings, and they have been found to provide an effective seal without danger of overcompressing the gasket material which has been a difficulty previously.

It will be understood that the description and drawings are only exemplary of the invention.

I claim as my invention:

1. A gasket suitable for use between members to be joined together, the gasket comprising a sheet of elastic and resilient compressible material having upper and lower sealing surfaces, at least one relatively large opening passing through the gasket, the gasket material at the sides of said opening designed to contact a fluid to be confined by the gasket during use thereof, a first aperture smaller than said opening extending through the sheet of compressible material to accommodate fastening means joining and bringing the members together, a second aperture of smaller cross section than said first aperture disposed adjacent the first aperture and within a distance of five times the diameter of the first aperture, the second aperture extending through the sheet material substantially perpendicular to the plane of the sealing surfaces, and a stop of relatively incompressible material disposed in the second aperture, the stop having a central portion with a cross section fitting snugly within the second aperture to resist accidental escape therefrom, the stop being shorter than the length of the second aperture from upper to lower sealing surface when the gasket is uncompressed, the stop being tapered from its central portion to each of the ends thereof to provide relief at the ends, whereby when the gasket is applied to the members to be joined and the fastening means are applied and bring the members together the gasket is compressed until the members abut the stop member, the lateral flow of the gasket member in the second aperture being accommodated by the relieved ends of the stop member.

2. A gasket comprising a body of elastic and resilient compressible material having upper and lower sealing surfaces, at least one relatively large opening passing through the gasket, the gasket material at the sides of said opening designed to contact a fluid to be confined by the gasket during use thereof, an aperture smaller than the opening in the body extending from the upper sealing surface to the lower sealing surface to accommodate passage of fastening means, a second aperture smaller than the first aperture disposed adjacent the first aperture, a displaceable stop disposed in the second aperture, the length of the stop being at least 50% of the perpendicular distance from the upper to the lower sealing surfaces when the gasket is in an uncompressed state, but less than said perpendicular distance, the stop being of a diameter slightly greater than the cross-sectional dimensions of the second aperture whereby when the stop is placed in the second aperture it is frictionally held in place therein, and a free space around said stop at each end thereof providing relief means to accommodate lateral flow of the gasket body into the second aperture when it is compressed so as not to lap over the ends of the stop.

3. The gasket of claim 2, wherein the free space comprises an outwardly flared portion at each end of the second aperture.

4. The gasket of claim 2, wherein the stop has a peripheral groove intermediate its ends to provide sharp edges that are of a greater diameter than the diameter of the second aperture to enable the stop to be retained more securely in place in the second aperture.

References Cited in the file of this patent

UNITED STATES PATENTS

| | | |
|---|---|---|
| 368,189 | Carter | Aug. 16, 1887 |
| 695,174 | Roller | Mar. 11, 1902 |
| 1,692,857 | Oven | Nov. 27, 1928 |
| 1,942,703 | Hubbard et al. | Jan. 9, 1934 |
| 1,980,335 | Hewitt et al. | Nov. 13, 1934 |
| 2,357,257 | Goetze | Aug. 29, 1944 |
| 2,359,118 | Johnston | Sept. 26, 1944 |
| 2,442,313 | Price | May 25, 1948 |
| 2,532,891 | Chupp | Dec. 5, 1950 |

FOREIGN PATENTS

| | | |
|---|---|---|
| 238,244 | Great Britain | Dec. 10, 1925 |